United States Patent
Sacchet

(10) Patent No.: US 12,018,967 B2
(45) Date of Patent: Jun. 25, 2024

(54) DEVICE FOR DISPENSING AND DOSING POWDERY OR PASTY OR LIQUID MATERIALS

(71) Applicant: Hero Europe S.R.L., Salmour (IT)

(72) Inventor: Alessandro Sacchet, Salmour (IT)

(73) Assignee: Hero Europe S.R.L., Salmour (IT)

( * ) Notice: Subject to any disclaimer, the term of this patent is extended or adjusted under 35 U.S.C. 154(b) by 0 days.

(21) Appl. No.: 17/760,184

(22) PCT Filed: Jan. 26, 2021

(86) PCT No.: PCT/IT2021/050023
§ 371 (c)(1),
(2) Date: Aug. 4, 2022

(87) PCT Pub. No.: WO2021/156897
PCT Pub. Date: Aug. 12, 2021

(65) Prior Publication Data
US 2023/0069971 A1    Mar. 9, 2023

(30) Foreign Application Priority Data
Feb. 5, 2020    (IT) .................. 102020000002281

(51) Int. Cl.
*G01F 13/00*    (2006.01)
*B01F 33/841*    (2022.01)
*B01F 35/71*    (2022.01)
*B01F 101/30*    (2022.01)

(52) U.S. Cl.
CPC .......... *G01F 13/005* (2013.01); *B01F 33/841* (2022.01); *B01F 35/71775* (2022.01); *B01F 2101/30* (2022.01)

(58) Field of Classification Search
CPC .. B01F 35/31; B01F 33/841; B01F 35/71775; B01F 2101/30; B29B 7/603; B29B 7/244; G01F 13/005
See application file for complete search history.

(56) References Cited

U.S. PATENT DOCUMENTS 8,729,410 B2 * 5/2014 Hansen ................ G01G 13/248
177/25.18
10,501,213 B2 * 12/2019 Verhoest ................ G01G 17/00
(Continued)

*Primary Examiner* — Vishal Pancholi
*Assistant Examiner* — Robert K Nichols, II
(74) *Attorney, Agent, or Firm* — CHIP LAW GROUP

(57) ABSTRACT

A device for dispensing and dosing materials includes a plurality of containers connected to a plurality of pumps, and a dispensing apparatus that includes a rotary table and a drive assembly for actuating each pump. A pump mechanism includes a pump screw housed in a first pump chamber having an upward facing inlet and in a second pump chamber having an outlet hole facing downwards. The actuator includes a first driver and a second driver releasably connected to heads of the pump mechanism having a first delivery capacity and a second delivery capacity, respectively, of each pump. A movable hollow cylinder having port opens and closes the outlet hole. The port is connected to a second pump chamber based on adjustment of the rotary table of the dispensing apparatus with respect to each pump and a compressed state of an elastic spring after positioning the dispensing apparatus.

9 Claims, 3 Drawing Sheets

(56) References Cited

U.S. PATENT DOCUMENTS

2005/0247730 A1* 11/2005 Post .................. B01F 33/841
  222/1
2005/0269367 A1* 12/2005 Post .................. B01F 35/71775
  222/185.1

* cited by examiner

DEVICE FOR DISPENSING AND DOSING POWDERY OR PASTY OR LIQUID MATERIALS

CROSS REFERENCE TO RELATED APPLICATIONS

This application is a U.S. National Phase of International Patent Application No. PCT/IT2021/050023 filed on Jan. 26, 2021, which claims priority benefit of Italian Patent Application No. IT 102020000002281 filed in the Italian Patent Office on Feb. 5, 2020. Each of the above-referenced applications is hereby incorporated herein by reference in its entirety.

The present invention refers to a device for dispensing powdery or pasty or liquid materials.

In general, the present invention relates to: apparatuses for volume measurement and delivery of flowing fluids or solid materials including a screw conveyor, or mixing plants with mixing outlets that receive material from multiple component outlets, e.g. paint cans, with vessels as components fixed in a circular configuration on a horizontal table, e.g. around a vertical axis.

In particular, the present invention refers to feeding mechanisms characterized by the means for feeding the components to the mixer by means of helical screws, non-return devices, valves, apparatuses which require an external operation adapted to each repeated and identical operation for measuring and separating a predetermined volume of fluid or fluid-solid material from a supply or container equipped with electrical control means.

The state of the art is represented by the patent EP-B1-2 266 689 concerning an apparatus for delivering a plurality of powders and other fluid materials, comprising a plurality of containers for containing the powders, a plurality of metering pumps, connected to a container or having a connector for releasably connecting a container to the respective pump, in which the capacity of the metering pump, i.e. the quantity delivered at each revolution, in the case of screw pumps, is selectable. By using metering pumps whose capacity can be selected, it is possible to reduce the time required to dispense a certain amount of material and increase the accuracy with which this amount is dispensed. In other words, it becomes possible to optimize speed on the one hand and accuracy on the other. The metering pumps comprise two pump mechanisms, preferably separate, one mechanism with a relatively large dispensing capacity and another mechanism with a relatively small dispensing capacity, and a lid. With such pumps, the quantities to be dispensed can vary over a wide range. It is also preferred that the described apparatus comprises at least one weighing device for weighing at least one, preferably all the quantities dispensed. Optimization of speed and/or accuracy is further facilitated if said larger part is at least ten times larger than said smaller part.

Furthermore, the state of the art is represented by U.S. Pat. No. 3,739,958 concerning a valve for the accurate control of the quantity of plastic pellets in an injection molding machine, comprising a plunger disposed in a sliding manner through the center of a screw with reciprocating motion and a valve plug attached to the injection side of the plunger. The force of the plasticized material delivered by the swivel screw opens the cap against an external force acting against the plunger. When the rotation of the screw stops, the external force moves the cap, thereby accurately controlling the quantity of shot. A spring is placed between the head and the end of the barrel, so as to exert a permanent extraction force on the piston.

The invention of EP-B1-2 266 689 solves the problem of dosing precision but the possibility of selecting and operating only one pump mechanism of the two available through the fixed unit equipped with a single driver greatly reduces the effectiveness of the procedure dosage and dispensing.

The technical problem is solved by using a two-driver system to be able to simultaneously operate the two mechanisms present in each pump.

Another way to increase dispensing efficiency is using elastic recovery systems of the return phases present in the dispensing and dosing process, taking inspiration from the invention of U.S. Pat. No. 3,739,958.

Document WO-A1-2018/198147 of the same Applicant describes a device according to the preamble of claim 1.

Object of the present invention is solving the aforementioned prior art problems by providing a device for dispensing powdery, pasty or liquid materials capable of operating the two mechanisms of each pump present in the device almost simultaneously, drastically reducing the duration of dispensing and dosing.

A further object is providing a device for dispensing powdery or pasty or liquid materials that is as versatile as possible, separating and individually managing the opening and closing of the delivery holes downstream of each pump.

The aforesaid and other objects and advantages of the invention, as will appear from the following description, are achieved with a device for dispensing powdery or pasty or liquid materials as claimed in claim 1. Preferred embodiments and non-trivial variants of the present invention are the subject matter of the dependent claims.

It is understood that all enclosed claims form an integral part of the present description.

It will be immediately obvious that numerous variations and modifications (for example related to shape, sizes, arrangements and parts with equivalent functionality) can be made to what is described without departing from the scope of the invention as appears from the attached claims.

The present invention will be better described by some preferred embodiments, provided by way of non-limiting example, with reference to the attached drawings, in which.

Figure 1:
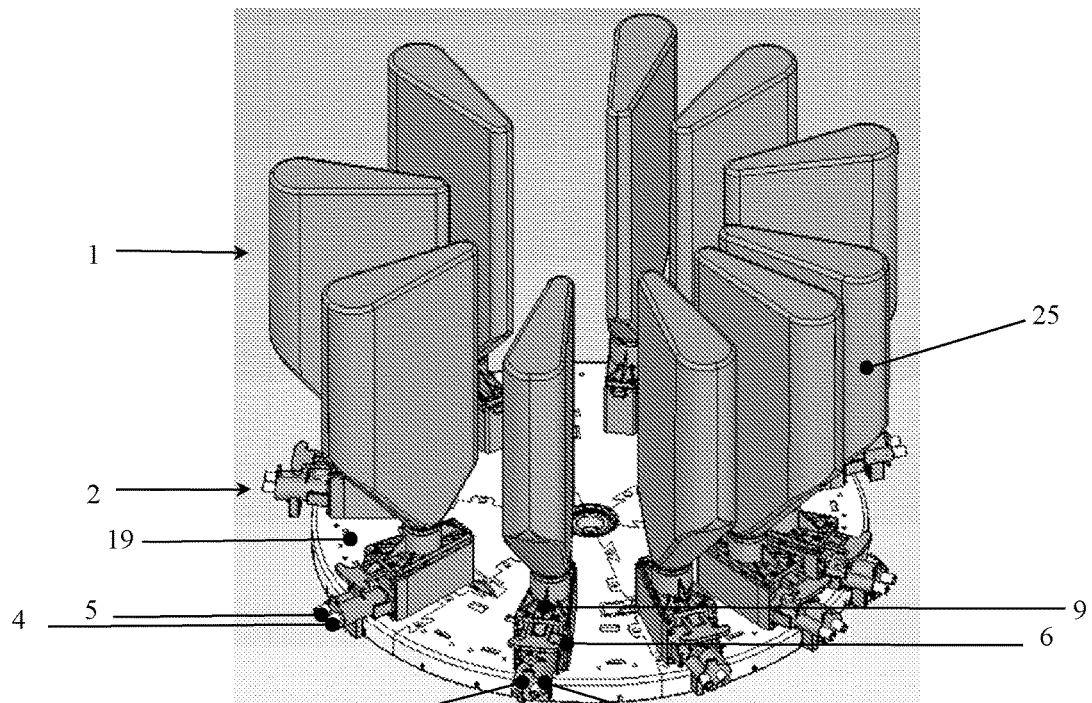
FIG. 1 shows an axonometric view of a first major part of an embodiment of the device for dispensing and dosing materials in powdery, liquid, pasty or creamy form, according to the present invention.

Referring to FIG. 1, 2, it is possible to note that a device for dispensing and dosing powdery, liquid, pasty or creamy materials of the invention, comprises a plurality of containers 1 to contain the materials, a plurality of pumps 2, a dispensing apparatus 3, each of the pumps 2 connected to a container 1 or having a connector for releasably connecting a container 1 to the respective pump 2. At least some of the pumps 2 include at least two pump mechanisms, one mechanism with a relatively large delivery capacity and another mechanism with a relatively small dispensing capacity. At least one of the mechanisms of the pump 2 comprises a pump screw 4, 5, preferably of the auger type, housed in a first pump chamber 6 and in a second pump chamber 7, 8. The pumps 2 further comprise a housing 9 having the first pump chamber 6 with an inlet facing upwards positioned under the container 1, the second pump chamber 7, 8 with an outlet hole facing downwards and, during dispensing, positioned on a container, and means to open and close the outlet hole 10. The dispensing apparatus 3 common to all the pumps 2 comprises means 11 for positioning the dispensing apparatus 3 with respect to each of the pumps 2 and means for actuating the mechanisms 12, 13 of each of the pumps 2.

Advantageously, the drive means 12, 13 comprise a first driver releasably connected to the head of the mechanism with a relatively large dispensing capacity of each of the pumps 2, and a second driver releasably connected to the head of the mechanism with a relatively small dispensing capacity of each of the pumps 2. In particular, the first driver and the second driver are operated independently after positioning the dispensing apparatus 3 with respect to each of the pumps 2.

Figure 2:
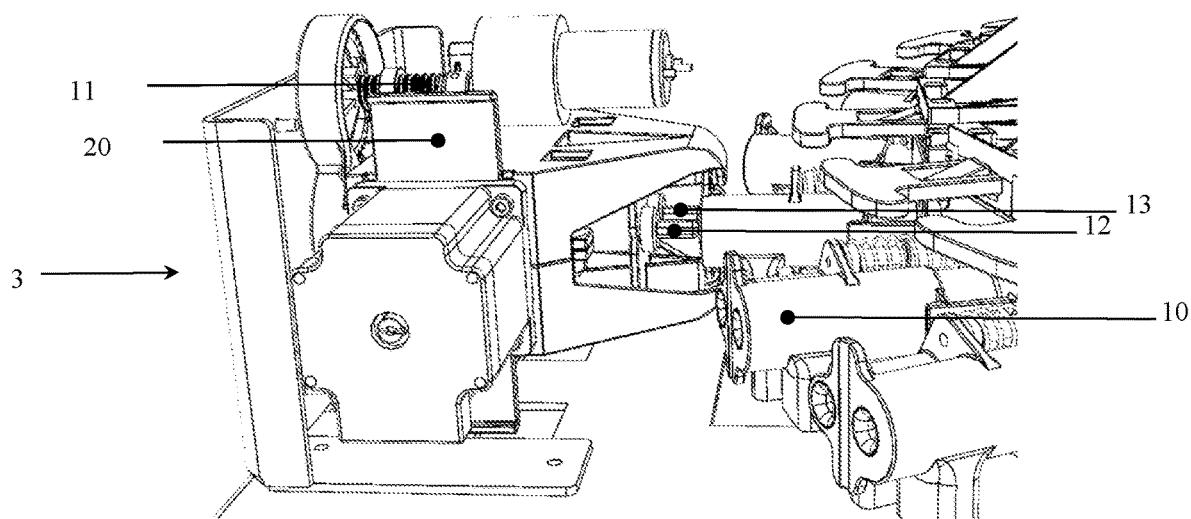
FIG. 2 shows an axonometric view of a second major part of an embodiment of the device for dispensing and dosing materials in powdery, liquid, pasty or creamy form, according to the present invention.
Figure 3:
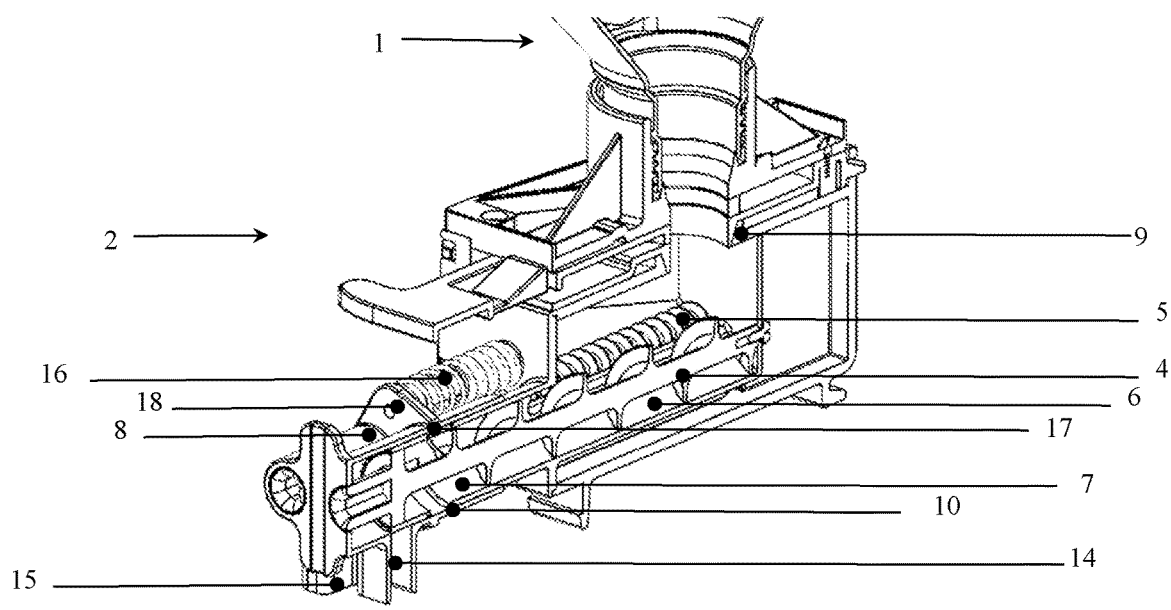
FIG. 3 shows a sectioned isometric view in a main plane of an apparatus of FIG. 1, in a first operating configuration.
Figure 4:
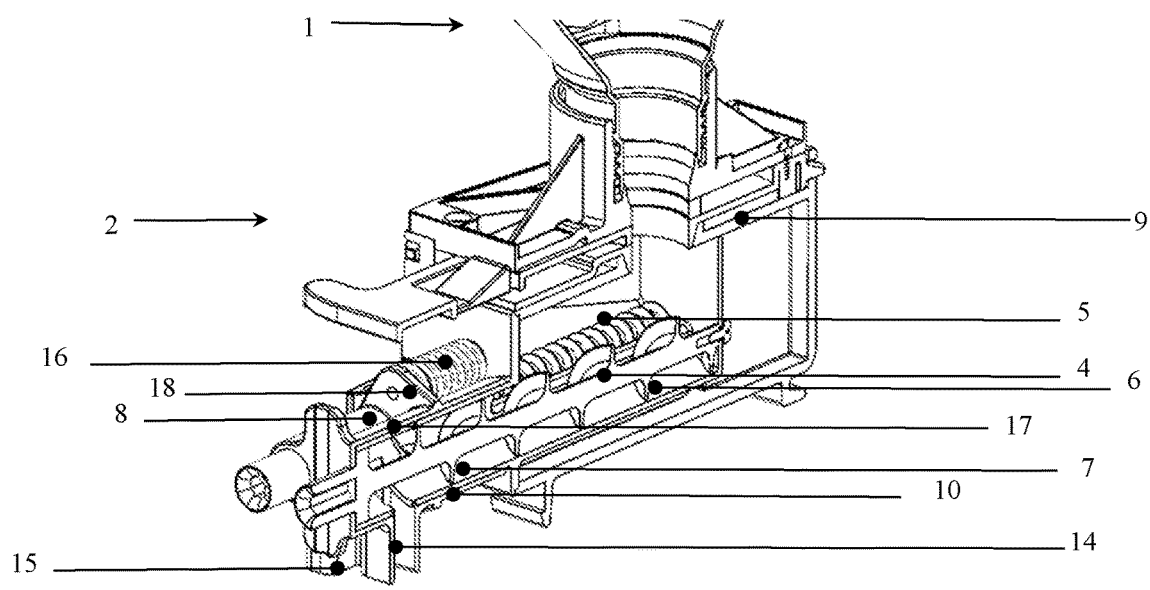
FIG. 4 shows the previous figure, in a second operating configuration.

Referring to FIGS. 3, 4, the means for opening and closing the outlet hole 10 comprise a movable hollow cylinder with a port 14, 15. The ports 14, 15 can be connected to the second chamber of the pump 7, 8 by means of positioning means 11 of the dispensing apparatus 3 with respect to each of the pumps 2, FIG. 2, and through at least one elastic spring 16 compressed after positioning the dispensing apparatus 3.

The movable hollow cylinder with an opening 14, 15 comprises a flanged portion 18 to interact with the elastic spring 16 with respect to the housing 9.

The movable hollow cylinder with a port 14, 15 comprises at least one sliding surface 17 for a linear sliding parallel to at least one of the mechanisms of the pump 2.

According to a variation not shown, the port 14 relating to the mechanism with a relatively large delivery capacity is positioned out of phase with respect to the port 15 relating to the mechanism with a relatively small delivery capacity. In this way, it is possible to obtain different connection combinations of the port 14, 15 with the second chamber of the pump 7, 8, depending on the position reached by the movable hollow cylinder with a port 14, 15, along a linear sliding section parallel to at least one of the pump mechanisms 2.

A rotary table 19 with respect to a vertical axis supports the plurality of containers 1 and the plurality of pumps 2, in order to be able to position each pump 2 aligned with respect to the actuation means 12, 13, FIG. 1. The drive means 12, 13 are placed on a turret 20 sliding on guides for the approach of the drive means 12, 13 with respect to the rotary table 19, FIG. 2.

Figure 5:
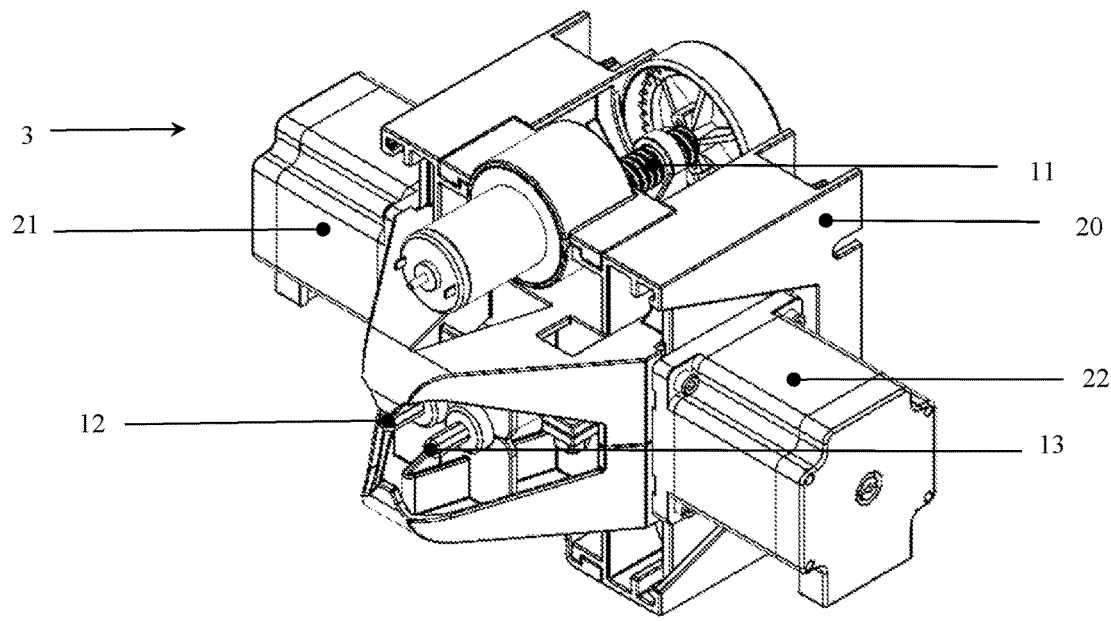
FIG. 5 shows an axonometric view of a third major part of an embodiment of the device for dispensing and dosing materials in powdery, liquid, pasty or creamy form, according to the present invention.

Referring to FIG. 5, the first and second drivers of the actuation means 12, 13 are operated by means of a pair of aligned and opposed motors 21, 22.

The first and second drivers of the actuation means 12, 13 are shaped to make a prismatic connection of the hub shaft with the respective head of the pump screw 4, 5 sliding axially.

Figure 6:
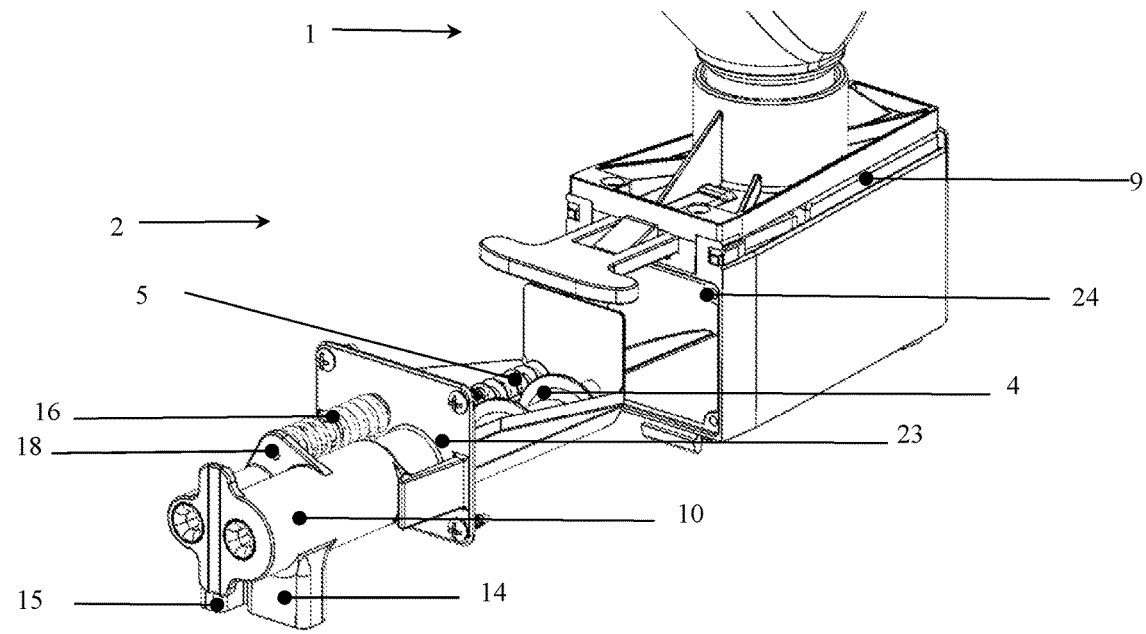
FIG. 6 shows an exploded view of FIG. 3.

Referring to FIG. 6, a cartridge 25 of each of the pumps 2 comprises the mechanism with a relatively large delivery capacity, the mechanism with a relatively small delivery capacity, the first pump chamber 6, the second pump chamber 7, 8, the hollow cylinder movable with a port 14, 15 with the flanged portion 18, the elastic spring 16 interacting with a portion of the wall 23. The portion of the wall 23 is adapted to releasably join a flanged edge 24 in order to constitute the housing 9.

The cartridge 25 is easily inserted into the interface seat of the housing 9.

Preferably, the second chamber of the pump 7, 8 is also provided with a plurality of ribs (not shown) designed to ensure sealing against the product that passes into the second chamber of the pump 7, 8 itself.

The flow of movement of powders and liquids takes place due to two dosing systems with different displacements, the screws 4, 5, in order to manage the optimization in terms of accuracy/speed ratio, by means of a positioning system of the rotary table 19 to allow the alignment with the drivers 12, 13 which are in a fixed position, which once aligned, through a second radial movement with respect to the rotary table 19 by means of the positioning means 11, are inserted into the provided cavities by exerting a thrust suitable for opening, mechanically, the outlet channels of the pumping system which, at the end of the cycle, will close due to the decompression of a spring 16.

The openings of the two mechanisms in a mutually out-of-phase position, that is, the opening of the mechanism with a relatively large dispensing capacity positioned out of phase with respect to the opening concerning the mechanism with a relatively small dispensing capacity, allow a management of the dosing phases.

In fact, throughout the stroke, there will be 3 main phases in succession:
phase 1. Channel of the first mechanism: closed, channel of the second mechanism: closed;
phase 2. Channel of the first mechanism: open, channel of the second mechanism: closed;
phase 3. Channel of the first mechanism: open, channel of the second mechanism: open.

The invention claimed is:
1. A device for dispensing and dosing materials in powdery, liquid, pasty or creamy form, the device comprising:
   a plurality of containers for containing the dosing materials;
   a plurality of pumps; and
   a dispensing apparatus, wherein
      each pump of the plurality of pumps is connected to a container or having a connector for releasably connecting the container to a respective pump of the plurality of pumps,
      at least one pump of the plurality of pumps comprising a plurality of pump mechanisms, a first mechanism having a first delivery capacity and a second mechanism having a second delivery capacity,
      at least one pump mechanism of the plurality of pump mechanisms comprising a pump screw of an auger type, housed in a first pump chamber and in a second pump chamber,
      the at least one pump of the plurality of pumps further comprises:
         a housing having the first pump chamber having an upward facing inlet located underneath the container, the second pump chamber having an outlet hole facing downwards; and
         a movable hollow cylinder having a port, wherein the dispensing apparatus is common to all pumps, and the dispensing apparatus further comprises:
            a positioning mechanism for positioning the dispensing apparatus with respect to each pump of the plurality of pumps; and a drive assembly comprising:
> a first driver releasably connected to a head of the first mechanism having the first delivery capacity of the at least one pump of the plurality of pumps; and
>
> a second driver releasably connected to a head of the second mechanism having the second delivery capacity of the at least one pump of the plurality of pumps, the first driver and the second driver operated independently after positioning the dispensing apparatus with respect to each pump of the plurality of pumps, the movable hollow cylinder having the port being configured to open and close the outlet hole, and the port is connected to the second pump chamber based on a positioning the dispensing apparatus with respect to the at least one pump of the plurality of pumps and a compressed state of at least one elastic spring after positioning the dispensing apparatus.

2. The device according to claim 1, wherein the movable hollow cylinder having the port comprises a flanged portion to interact with the elastic spring with respect to the housing.

3. The device according to claim 1, wherein the movable hollow cylinder having the port comprises at least one sliding surface for linear sliding parallel to at least one of the plurality of pump mechanisms.

4. The device according to claim 3, wherein the port relating to the first mechanism having the first delivery capacity is positioned out of phase with respect to the port relating to the second mechanism having the second delivery capacity, in order to obtain different connection combinations of the port having the second pump chamber, depending on a position reached by the movable hollow cylinder having the port, along a linear sliding section parallel to at least one of the plurality of pump mechanisms.

5. The device according to claim 1, wherein a rotary table with respect to a vertical axis supports the plurality of containers and the plurality of pumps in order to position each pump of the plurality of pumps aligned with respect to the drive assembly placed on a turret sliding on guides for approach of actuators with respect to the rotary table.

6. The device according to claim 1, wherein the first and the second drivers of the drive assembly are operated by a pair of aligned and opposed motors.

7. The device according to claim 1, wherein the first or the second driver of the drive assembly is shaped to make a prismatic connection of a hub shaft having the respective head of the pump screw sliding axially.

8. The device according to claim 1, wherein a cartridge of the at least one pump of the plurality of pumps comprises the first mechanism having the first delivery capacity, the second mechanism having the second delivery capacity, the first pump chamber, the second pump chamber, the movable hollow cylinder having the port with a flanged portion, the elastic spring interacting with a portion of wall, wherein the portion of the wall releasably joins to a flanged edge in order to constitute the housing.

9. The device according to claim 1, wherein the second pump chamber is equipped having a plurality of ribs designed to ensure sealing against a product passing into the second pump chamber.

* * * * *